United States Patent
Zarakas et al.

(10) Patent No.: US 11,734,671 B2
(45) Date of Patent: Aug. 22, 2023

(54) DYNAMICALLY DISPLAYING CONTEXTUAL INFORMATION ON A SMART CARD

(71) Applicant: Capital One Services, LLC, McLean, VA (US)

(72) Inventors: James Zarakas, Centreville, VA (US); Molly Johnson, Alexandria, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 136 days.

(21) Appl. No.: 17/181,119

(22) Filed: Feb. 22, 2021

(65) Prior Publication Data

US 2022/0270076 A1 Aug. 25, 2022

(51) Int. Cl.
| | |
|---|---|
| *G06Q 40/00* | (2023.01) |
| *G06Q 20/34* | (2012.01) |
| *G06K 19/07* | (2006.01) |
| *G06Q 20/32* | (2012.01) |
| *G06N 5/02* | (2023.01) |

(52) U.S. Cl.
CPC ....... *G06Q 20/341* (2013.01); *G06K 19/0716* (2013.01); *G06K 19/0723* (2013.01); *G06N 5/02* (2013.01); *G06Q 20/3224* (2013.01)

(58) Field of Classification Search
CPC ............. G06Q 20/341; G06Q 20/3227; G06K 19/0716; G06K 19/0723; G06N 5/02
See application file for complete search history.

(56) References Cited

U.S. PATENT DOCUMENTS

| | | | |
|---|---|---|---|
| 8,123,128 B1 * | 2/2012 | Zhu | G06Q 20/227 235/375 |
| 8,830,160 B2 | 9/2014 | Gila et al. | |
| 9,704,089 B2 | 7/2017 | Mullen et al. | |
| 9,892,405 B2 | 2/2018 | Olson et al. | |

(Continued)

FOREIGN PATENT DOCUMENTS

WO WO-2008070184 A1 * 6/2008 ............. G06Q 30/02

OTHER PUBLICATIONS

Ren et al., "A Smart Network with Active Services for Wireless Context-Aware Multimedia Communications," IEEE 0-7803-5554-7/99, 1999 (Year: 1999).*

(Continued)

*Primary Examiner* — Abhishek Vyas
*Assistant Examiner* — William B. Bunker
(74) *Attorney, Agent, or Firm* — Banner & Witcoff, Ltd.

(57) ABSTRACT

The present disclosure describes a smart card that determines a context associated with the smart card and displays information based on the determined context. The smart card may determine a location of the smart card. Based on the determined location, the smart card may retrieve a list of establishments. The list of establishments may be used to determine a context, for example, based on information related to the establishments, historical information, user information, etc. Once the context is determined, the smart card may select information to display on the smart card. By limiting the information displayed on the smart card, the smart card may limit what can be captured by bad actors, thereby improving the security of the smart cards.

20 Claims, 9 Drawing Sheets

(56) References Cited

U.S. PATENT DOCUMENTS

| | | | |
|---|---|---|---|
| 10,380,581 B2 | 8/2019 | Zarakas et al. | |
| 10,438,191 B2 | 10/2019 | Zarakas et al. | |
| 10,657,520 B2 | 5/2020 | Zarakas et al. | |
| 2008/0223937 A1* | 9/2008 | Preta | G06F 21/83 235/492 |
| 2012/0296724 A1* | 11/2012 | Faro | G06Q 30/00 705/14.27 |
| 2014/0244494 A1* | 8/2014 | Davis | G06Q 20/36 705/41 |
| 2016/0306977 A1 | 10/2016 | Zarakas et al. | |
| 2016/0307188 A1* | 10/2016 | Zarakas | G06Q 20/354 |
| 2017/0109730 A1* | 4/2017 | Locke | G06K 19/02 |
| 2017/0148081 A1* | 5/2017 | Chauhan | G06Q 30/0631 |
| 2019/0272541 A1 | 9/2019 | Koeppel et al. | |
| 2021/0334116 A1* | 10/2021 | Kaplan | G06F 3/04842 |
| 2021/0357826 A1* | 11/2021 | Sakamoto | G06Q 30/0201 |
| 2022/0108299 A1* | 4/2022 | Gupta | G06K 19/0702 |

OTHER PUBLICATIONS

Markus Ullmann, "Flexible Visual Display Units as Security Enforcing Compnent for Contactless Smart Card Systems," Federal Office for Information Security, Bonn, Germany, 2007 (Year: 2007).*

\* cited by examiner

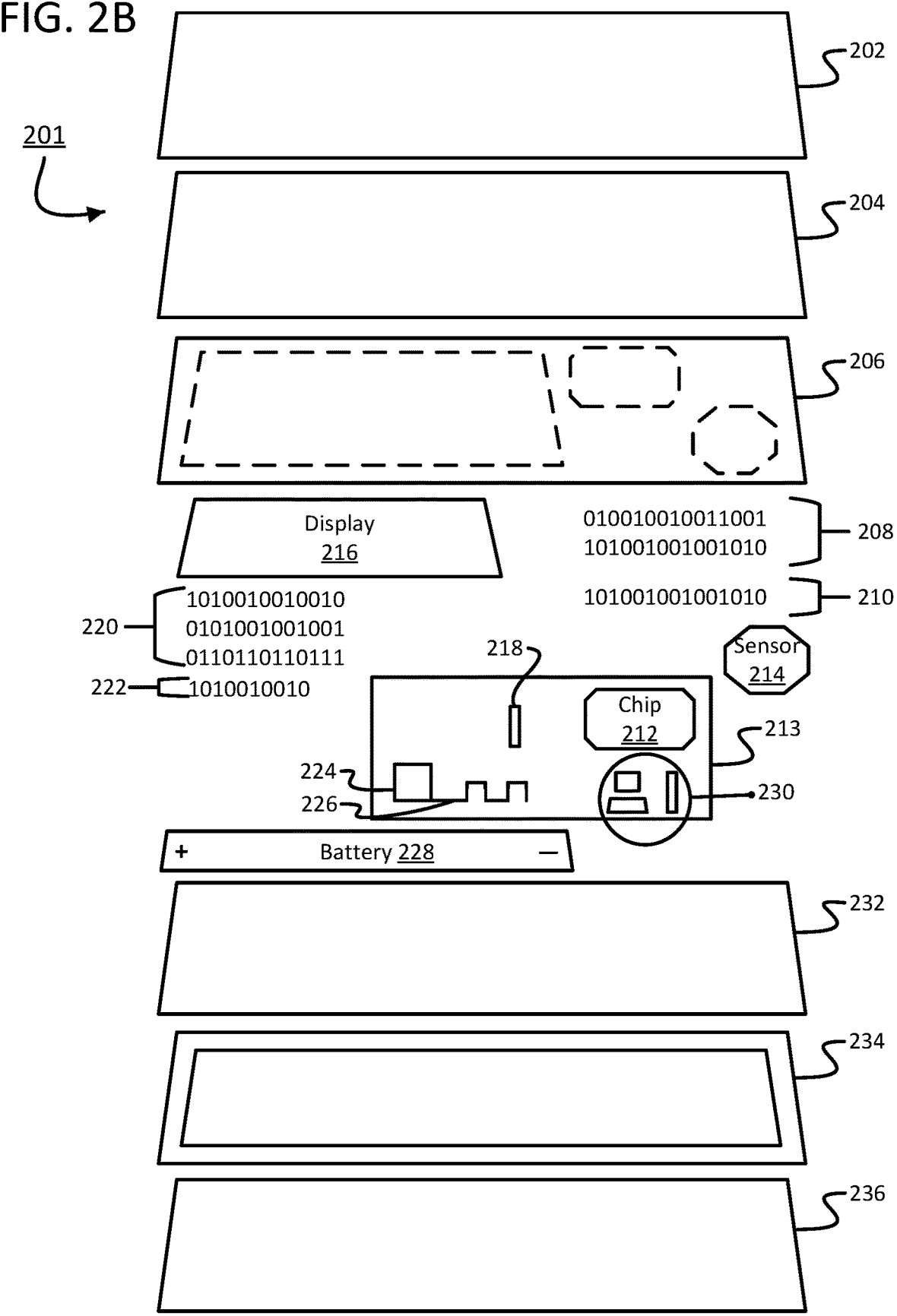

DYNAMICALLY DISPLAYING CONTEXTUAL INFORMATION ON A SMART CARD

FIELD OF USE

Aspects of the disclosure generally relate to a smart card and, more specifically, to a smart card that dynamical displays contextual information.

BACKGROUND

Cards, such as bank cards and identity cards, may contain personally identifiable information (PII) about the cardholder and/or other sensitive information (e.g., an account number, a Card Verification Value (CVV), etc.). If a card is lost or stolen, the PII and/or other sensitive information may be compromised. That is, a malicious user may use the sensitive information contained on the lost or stolen card to their advantage. Moreover, cameras have become ubiquitous, from surveillance cameras to cameras on mobile devices. These cameras may be used for nefarious purposes to capture the PII and/or other sensitive information when the cardholder extracts the card from its secure location to use the card.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes a smart card that determines a context associated with the card and displays information based on the determined context. By limiting the information displayed on the smart card, the smart card may limit what can be captured by bad actors, thereby improving the security of the smart cards.

The present application describes methods, devices, systems, and/or instructions stored on non-transitory computer-readable media for dynamically displaying information based on a context associated with a smart card. The smart card may determine a location of the smart card, untethered from a mobile device or any other device. Based on the determined location, the smart card may obtain a list of establishments (e.g., bars, stores, restaurants, etc.) associated with the location. Using the list of establishments, the smart card may then determine a first context associated with list of establishments, which may then be used to select which information to display on the smart card itself. The smart card may then cause that information to be displayed via a configurable display panel of the smart card.

In some instances, the smart card may use predictive modeling and/or predictive analytics to determine a context and which information to display. In this regard, the smart card may determine a location of the smart card, as described above. However, if the smart card is unable to ascertain and/or discern location information, the smart card may use predictive modeling, predictive analytics, and/or historical information to generate a prediction of the next location of the smart card. Based on the predicted location, the smart card may obtain another list of establishments associated with the next predicted location. The smart card may then determine a second context, select different information to display, and cause the different information to be displayed.

By controlling what information is displayed in different locations, the smart card may prevent malicious users from gleaning information from the smart card when the smart card is being used. Moreover, the smart card may limit the disclosure of PII and/or other sensitive information if the smart card is lost or stolen by dynamically updating the display to remove the PII and/or sensitive information.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIGS. 2A and 2B shows a smart card in accordance with one or more aspects of the disclosure;

DETAILED DESCRIPTION

Figure 1:
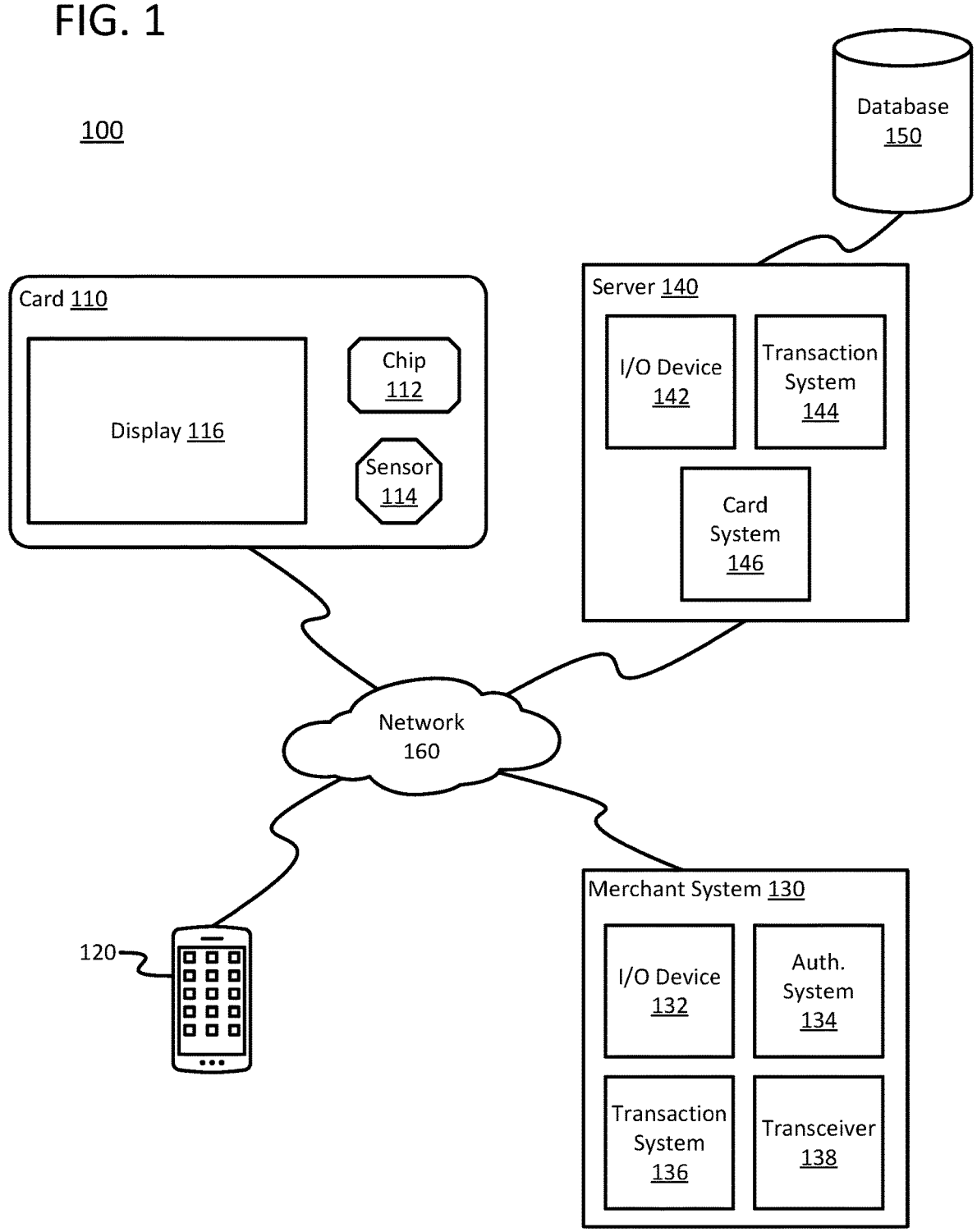
FIG. 1 shows an example of a system in which one or more features described herein may be implemented.

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or instructions stored on non-transitory computer-readable media for dynamically changing the display information of a smart card based on a determined context. The present application describes methods, devices, systems, and/or instructions stored on non-transitory computer-readable media for dynamically updating the display of a smart card based on a determined context. In this regard, the smart card may determine a location of the smart card, for example, using one or more antennas or a radiolocation mechanism. In some instances, the one or more antennas and/or the radiolocation mechanism may be co-located and/or integral with a microcontroller, such as microcontroller 224. That is, the smart card may determine the smart card's location without communicating with a mobile device or any other device and, instead, use location services located on the smart card itself. Once the location has been determined, the smart card may retrieve a list of establishments that correlate with the determined location. The smart card may then use the list of establishments to determine a first context for the smart card. For example, the smart card may determine that the smart card is located within a pharmacy based on the location of the smart card and the list of establishments indicating the pharmacy as being closest to the smart card's location. In some instances, the smart card may also use transactional information determine the first context. Transactional information may include merchant transaction history, purchase history, etc. In this regard, the location and the transactional information may be used in conjunction to determine the first context. Based on the first context, the smart card may select which information to display on the smart card, and then cause that information to be displayed.

In addition to using location information and transaction information, the smart card may use predictive modeling (e.g., predictive analytics, machine learning) to determine a context associated with the smart card. Occasionally, the smart card may use predictive modeling (e.g., predictive analytics, machine learning) to generate a prediction of the next location of the smart card. Once the next location is predicted, the smart card may use a list of establishments associated, historical information, and/or user information to determine a second context for the smart card. The second context may then be used to determine what information to display via the smart card. The smart card may then determine a second context, select different information to display, and cause the different information to be displayed. By using the techniques described above, the smart card may limit what can be captured by bad actors, thereby improving the security of the smart cards. Moreover, limiting what is displayed based on the context and/or location may prevent malicious users from obtaining information displayed on the smart card illegally, may improve privacy, and/or may prevent data leakage.

FIG. 1 shows an example of a system 100 that includes a smart card 110, a user device 120, a merchant system 130, and a server 140, connected to a database 150, interconnected via network 160.

Smart card 110 may comprise a card capable of determining a context associated with the card and displaying information associated with the context. In this regard, smart card 110 may be any type of card with a built-in processor and/or memory, that may be used for financial transactions and/or identification. For example, smart card 110 may comprise a bank card, such as a debit card or credit card. Alternatively, smart card 110 may be an identification card, such as a driver's license (e.g., REAL ID). As shown in FIG. 1, smart card 110 may comprise a chip 112, a sensor 114, and a display 116. Chip 112 may be a smart chip or an integrated circuit. In this regard, chip 112 may comprise a microprocessor and memory, such as read only memory (ROM) and random access memory (RAM). Additionally, chip 112 may include one or more contact pads. The contact pads may be used to receive voltage to power the smart card and exchange signals with a terminal, such as user device 120, merchant system 130, and/or server 140. In some embodiments, chip 112 may be configured to execute one or more applications. The applications may allow chip 112 to process payments, for example, using a payment application. In other examples, the applications may allow chip 112 to perform cryptographic processing, authenticate smart card 110, define risk management parameters (e.g., when the transaction may be conducted offline), digitally sign payment data, and verify the cardholder. In further examples, chip 112 may be determine a context associated with the smart card to determine what information to display. In this regard, chip 112 may compare user information to a list of known establishments associated with a geographic location, for example, using machine learning, predictive modeling, and/or predictive analytics. In this regard, chip 112 may select a subset of information to be displayed via the smart card. In some embodiments, chip 112 may be a dual interface chip that provides for contact and contactless interfaces.

Sensor 114 may comprise one or more sensors that allow smart card 110 to communicate with other devices, including, for example, user device 120, merchant system 130, and/or server 140. Sensor 114 may comprise a single sensor, multiple sensors working in collaboration, or a sensor array. The sensors may comprise a wireless transceiver and/or a short-range wireless transceiver, such as Bluetooth, Bluetooth Low Energy, Near Field Communication (NFC), WiFi Direct, or an equivalent thereof.

Display 116 may be any suitable display capable of presenting information associated with card 110. As noted above, the information may comprise transactional information, such as an account number (e.g., credit/debit card number), a card verification value (CVV), an expiration date, a signature, a photo, an account balance, a spending limit, or the like. Alternatively, the information may comprise personal information, including, for example, a photo, a full legal name, an identification number (e.g., a driver's license number, a social security number, etc.), a personal address, a date-of-birth, etc. As will be discussed in greater detail below, display 116 may comprise a liquid crystal display (LCD) display technology, a light emitting diode (LED) display technology, ePaper technology (e.g., e-ink), vacuum fluorescent display technology, and/or the like.

User device 120 may be a mobile device, such as a cellular phone, a mobile phone, a smart phone, a tablet, a laptop, or an equivalent thereof. Additionally or alternatively, user device 120 may be a computing device configured to allow a user to execute software for a variety of purposes, such as a desktop computer, laptop computer, or, alternatively, a virtual computer. User device 120 may provide a first user with access to the Internet. Additionally, user device 120 may provide the first user with one or more applications ("apps") located thereon. The one or more applications may provide the first user with a plurality of tools and access to a variety of services.

Merchant system 130 may comprise a transaction terminal or a Point-of-Sale (PoS) terminal. In this regard, merchant system 130 may comprise device, an input/output device 132, an authorization system 134, a transaction system 136, and/or a transceiver 138. Input/output device 132 may comprise a card reader (e.g., slot reader, EMV reader), a contactless reader, keypad, keyboard, mouse, microphone, camera, touch screen, printers, USB flash drives, speakers, and/or any other device configured to receive and transmit electronic data. Authorization system 134 may comprise one or more software and/or hardware components capable of authorizing a transaction. Transaction system 136 may comprise hardware, software, or a combination thereof capable of communicating with user device 120, merchant system 130, and/or server 140. In this regard, transaction system 136 may be part of a credit card network configured to process transactions. Transceiver 138 may be any interface capable of communicating (e.g., exchanging data and information with) smart card 110, user device 120, and/or server 140. Transceiver 138 may communicate directly with smart card 110, user device 120, and/or server 140. Alternatively, transceiver 138 may communicate with smart card 110, user device 120, and/or server 140 through a network, such as network 160. In this regard, transceiver 138 may comprise one or more of a short-range wireless transceiver, a modem, an antenna, a network interface that may provide or enable wireless and/or wire line digital and/or analog interface to one or more networks, or an equivalent thereof.

Server 140 may be a stand-alone server, a corporate server, or a server located in a server farm or cloud-computer environment. According to some examples, server 140 may be a virtual server hosted on hardware capable of supporting a plurality of virtual servers. In some embodiments, server 140 may be a financial institution that issued smart card 110. In other embodiments, server 140 may be an authentication, authorization, and accounting (AAA) entity configured to authenticate a user associated with the smart card. For example, the AAA server may be associated with motor vehicles or a state and/or federal identity issuing office.

As shown in FIG. 1, server 140 may comprise input/output device 142, transaction system 144, and card system 146. Input/output device 142 may be similar to input device 132. In this regard, input/output device 142 may comprise a card reader (e.g., slot reader, EMV reader), a contactless reader, keypad, keyboard, mouse, microphone, camera, touch screen, printers, USB flash drives, speakers, and/or any other device configured to receive and transmit electronic data. Similarly, transaction system 144 may be similar to transaction system 136. Accordingly, transaction system 144 may comprise hardware, software, or a combination thereof that is capable of communicating with smart card 110, user device 120, and/or merchant system 130. In this regard, transaction system 144 may be part of a credit card network configured to process transactions. Card system 146 may comprise hardware, software, or any combination thereof, configured to store data associated with smart card 110. This data may comprise a card number, an account type, an account balance, account limits, budget data, recent transactions, pairing data such as time and date of pairing with a mobile device, and the like. Additionally or alternatively, the data associated with card system 146 may comprise cardholder data, such as, cardholder name, address, phone number(s), email address, demographic data, and the like.

Database 150 may be configured to store data and/or information on behalf of server 140. The information may include, but is not limited to, personal information, account information, and user-preferences. Personal information may include a user's name, address, phone number (i.e., mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. Database 150 may include, but are not limited to relational databases, hierarchical databases, distributed databases, in-memory databases, flat file databases, XML databases, NoSQL databases, graph databases, and/or a combination thereof.

Network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2A:
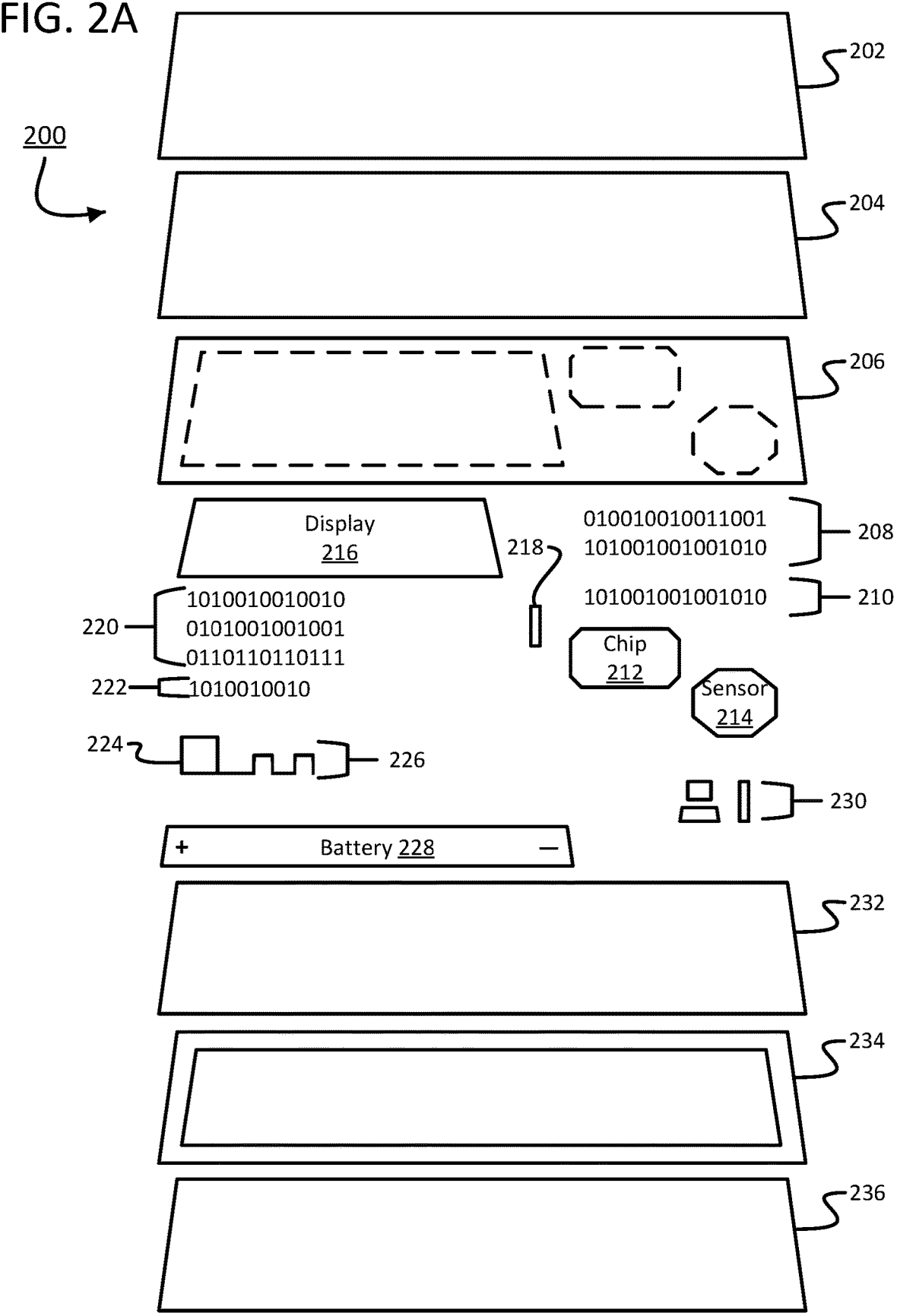

As noted above, smart cards may determine a context associated with the card and display information based on the determined context. FIGS. 2A and 2B show an example of a smart card 200 according to one or more aspects of the disclosure.

In this regard, FIG. 2A shows that smart card 200 may comprise a top output layer 202, a top protective layer 204, a potting 206, a chip 212, a sensor 214, a display 216, a display driver 218, a microcontroller 224, a battery 228, a power management system 230, a printed circuit board (PCB) 232, a chassis 234, and a card backing 236.

Top output layer 202 may comprise a scratch-resistant or scratch-proof material. For example, top output layer 202 may comprise a film covering, a plastic covering, or the like. The top output layer 202 may be constructed from polyvinyl chloride (PVC), polylactic acid (PLA), acrylonitrile butadiene styrene (ABS), polyethylene terephthalate (PET), Polyethylene terephthalate glycol-modified (PET-G), polyester film or plastic sheet (e.g., Mylar), polycarbonate (PC), or an equivalent thereof. Smart card 200 may also comprise top protective layer 204, which may comprise a clear scratch-resistant coating and/or scratch-proof material to secure and/or protect the inner components (e.g., electrical components) of smart card 200. Top protective layer 204 may comprise materials coated with a scratch resistant chemical coating, such as a UV curable chemical coating. Top protective layer 204 differs from top output layer 202 in that the scratch-proof materials may comprise a mineral glass, a sapphire glass, thin film alloys, ITO, ZnO, PVC, PET, BoPET (e.g., Mylar), polyvinylidene fluoride (e.g., Kynar), polyvinylidene difluoride, PC, PET-G, and/or an equivalent thereof.

Potting 206, or a filler epoxy, may be included in smart card 200. In this regard, potting 206 may surround the electrical components to provide additional protection (e.g., strength and/or water resistance). Potting 206 may include a light guide, which may be constructed of optical grade materials such as acrylic, resin, polycarbonate, epoxies, and/or glass. Potting 206 may be injection molded, such as over molding and/or multi-shot to encapsulate the components of smart card 200. For example, injection molding may comprise ABS, thermoplastic elastomers (TPE), thermoplastic vulcanizate (TPV), thermoplastic polyurethane (TPU), PET, polycarbonates (PC), cold lamination of the outer films to the body of the card using thermoactive adhesives, hot lamination of the outer films to the body of the card using thermoactive adhesives, and/or silicone.

Chip 212 may be a smart chip or an integrated circuit. As discussed above, chip 212 may comprise a microprocessor, memory, and/or one or more contact pads. The one or more contact pads may interact with and/or be connected to a terminal configured to read data stored, for example, on a processor and/or memory of a chip 212. In this regard, the memory may store a number of applications. For example, chip 212 may store Java Applet 208 and/or Java Applet integration 210 in its memory. While Java Applet 208 and Java Applet integration 210 are used throughout the specification, it will be appreciated that any other suitable type of application and/or interface may be used. Java Applet 208 may comprise code that executes payments, such as payment made using chip 202. Java Applet 208 may comprise code that causes chip 212 to determine a context associated with smart card 200 and display, via display 216, data and/or information associated with the context. In another example, application cryptograms, which may be stored in chip 212's memory, may be used to exchange data packets with a terminal (e.g., merchant system 130) on behalf of smart card 200 during a transaction. In this regard, data packets may include user authentication information which may be used to authenticate transaction card 200 during a transaction. Various cryptographic protocols and/or methods may be used in this data transmission and reception process. Chip 212 may be configured to receive one or more script commands, for example, during a transaction. These script commands and/or data packets may be transmitted between parties over a network. Script commands may be used, for example, to block transactions, change transaction data stored on chip 212 (e.g., transaction history, account limits, account balance, and/or the like). Additionally, chip 212 may be used to perform offline data authentication. For example, public key cryptography may be used to perform payment data authentication. Offline data authentication may use Static Data Authentication (SDA), Dynamic Data Authentication (DDA), and/or Combined Data Authentication (CDA). In further examples, chip 112 may determine a context associated with the smart card to determine what information to display. In this regard, chip 212 may be configured to compare user information to a list of known establishments associated with a geographic location, for example, using machine learning, predictive modeling, and/or predictive analytics. Based on this comparison, chip 212 may select a subset of information to be displayed via the smart card.

The memory of chip 212 may also store firmware 220 and/or a bootloader 222. Bootloader 222 may comprise code that is executed when smart card 200 is activated and before any operating system, firmware, or other code is executed. Bootloader 222 may be activated, for example, via sensor 214 and/or battery 228. Additionally or alternatively, bootloader 222 may be activated and/or load an application and/or program upon detection that card 200 has been inserted into a terminal, charger, and/or the like. In this regard, bootloader 222 may be active for a short period after smart card 200 is powered up. Smart card 200 may also be activated using program code that may be flashed directly to a microprocessor, such as chip 212 or microcontroller 224. In some embodiments, smart card 200 may not use a bootloader 222, but instead may cycle between a sleep state and an active state using program code and/or memory.

As noted above, smart card 200 may comprise one or more sensors 214. One or more sensors 214 may be configured to receive input. In this regard, sensors 214 may comprise an activation sensor and/or an operation sensor, which may be combined and/or separate. An activation sensor may activate the smart card 200 and an operation sensor may instruct the smart card 200 to perform an action based on the received input. An activation sensor may require a security input, such as a biometric input (e.g., fingerprint, eye scan, voice recognition, and/or the like), input indicative of a paired mobile device (e.g., BLE and/or Bluetooth pairing), input indicative of a password (e.g., a password received via a sensor on the smart card and/or a password received on a paired mobile device), and/or the like. An operation sensor may change a display 216 based on received input, conduct a transaction via, for example, chip 212 and/or contactless payment technologies based on received input, attempt a pairing of a card 200 and a mobile device, and/or the like.

Sensor 214 may comprise a capacitive touch sensor, a piezoelectric sensor, an inductive sensor, load cells, a light sensor, a temperature sensor, a resistive touchscreen, including for example an analogue matrix real (AMR) sensors, or an equivalent thereof. Sensor 214 may comprise one or more accelerometers and/or photosensors to detect motion input. It will be appreciated that sensor 214 may be located at any portion of smart card 200 to detect, for example, touch, light, heat, energy, and/or the like. In some instances, sensor 214 may be placed around the outer edges of a smart card 200 or at any spot within the smart card 200. Sensor 214 also may include the entire exterior surface of transaction card 200.

Smart card 200 may comprise display 216. Display 216 may be configured to present (e.g., display) data and/or information associated with a context determined by chip 212. Display 216 may comprise one or more of a liquid crystal display (LCD) screen, a light emitting diode (LCD) display, an e ink display, an electronic paper display, or a microparticle-based display. Smart card 200 may also include a display driver 218 configured to translate instructions from a device, such as chip 212 or microcontroller 224, into display images via display 216. Display driver 218 may include an integrated circuit (IC), a state machine, and/or the like that provides an interface between the display, chip 212, and/or microcontroller 224. A display driver 218 may comprise memory (e.g., RAM, Flash, ROM, and/or the like) and/or firmware.

As discussed herein, display 216 may be altered and/or modified, for example, depending on a detected context. For example, smart card 200 may be a bank card (e.g., credit card, debit card, etc.) that determines that the cardholder is attempting to purchase a good or service in a public location (e.g., a store). In this regard, smart card 200 may display, via display 216, a photo of the cardholder, their signature, and/or an expiration date of their card as part of the transaction. Accordingly, the card number and/or the CVV may be hidden. In another example, smart card 200 may determine that the cardholder is attempting to purchase a good or service online, from their home. In this example, smart card 200 may display, via display 216, the card number and/or the CVV, and hide a photo of the cardholder, their signature, and/or the expiration date. In yet another example, smart card 200 may be an identification card (e.g., license, passport, etc.) that determines the user is attempting to purchase alcohol. Accordingly, smart card 200 may display, via display 216, the cardholder's photo, name, and/or data of birth and hide the cardholder's address and/or identification information. In some instances, display 216 may comprise a plurality of light emitting diodes (LEDs) that may be illuminated to convey information about the cardholder. For example, the plurality of LEDs may be illuminated to a first color (e.g., green) to convey that the user of the smart card is permitted to perform a first action; a second color to convey that the user of the smart card is permitted to perform a second action; and/or a third color to convey that the user is not permitted to perform the first action or the second action. It will be appreciated that the examples discussed above are merely illustrative and that the smart card 200 may display different information based on the detected context.

In some examples, smart card 200 may comprise microcontroller 224 and antenna 226. Antenna 226 may include, for example, a loop antenna, a fractal antenna, and/or the like. Antenna 226 may be configured to communicate with one or more devices, including, for example, user device 120, merchant system 130, and/or server 140. Microcontroller 224 may also communicate with chip 212, Java Applet 208, Java Applet integration 210, sensor(s) 214, power management 230, antenna 226, battery 228, display 216, display driver 218, firmware 220, bootloader 222, and/or any other component of smart card 200. Microcontroller 224 may control the card operations to conduct transactions and/or display data.

Battery 228 may comprise any suitable energy storage component capable of providing power to one or more components of smart card 200. In this regard, battery 228 may comprise a lithium polymer battery, a lithium-metal battery, lithium-ceramic battery, and/or any other type of battery. Battery 228 may be constructed from any suitable material, including rigid materials, semiflexible materials, and/or flexible materials.

Smart card 200 may comprise a power management component 230 that may manage the charging and discharging of battery 228. Power management component 230 may convert voltage to a predetermined level in order to operate smart card 200. Power management component 230 and/or battery 228 may include, for example, solar power cells to convert solar energy into an electrical current within a solar panel. Power management component 230 and/or battery 228 may comprise connections to sensors 214 to receive input and activate smart card 200 (e.g., motion input, thermal input, manual input, touch input, and/or the like). In some instances, power management component may comprise a supercapacitor or an ultracapacitor configured to bridge the gap between electrolytic capacitors and battery 228. The supercapacitor, or ultracapacitor, may allow for high-speed charging of smart card 200.

PCB 232 may comprise a PCB mounted in a flexible plastic substrate. The flexible plastic substrate may comprise at least one of a polyimide, polyether ether ketone, and/or a transparent conductive polyester film. PCB 232 may be printed, using, for example screen printing, 3D printing, or an equivalent thereof, to arrange circuits on a material, such as polyester. PCB 232 may comprise one or more electronic components and/or connections that power smart card 200. PCB 232 may control and/or provide integration between the components of smart card 200. For example, PCB 232 may mechanically support and/or electronically connect the electronic components of smart card 200 using, for example, conductive leads, tracks, pads, and/or other features. PCB 232 may be combined with an energy component (e.g., battery component, power component, etc.). PCB 232 may also provide antenna support. A flexible printed circuit (FPC) may be used in place of or in conjunction with PCB 232. A FPC may be fabricated using photolithographic technology. Additionally or alternatively, the FPC may be printed, silkscreened, or an equivalent thereof. The FPC may be used as a structural member for the electronic components of smart card 200.

Chassis 234 may be included in smart card 200 as a frame or support structure. Chassis 234 may be a mount for PCB 232 and may be constructed out of flexible or semi-flexible material. Chassis 234 may be constructed using one or more of PVC, PC, ABS, styrene, polycarbonate, polyester, PET, any material that is easily molded, deposited, or laser cut (e.g., organic or inorganic material such as paper, plastic, and/or engineered ceramics), and/or an equivalent thereof. Additionally or alternatively, chassis 234 may be made from a conductive material or doped with a conductive material. Chassis 234 may increase the rigidity of smart card 200 to prevent damage. Chassis 234 may also be used to detect if smart card 200 is being held, for example, using sensors 214. When chassis 234 is constructed out of a conductive material, a dielectric constant of chassis 234 and/or card 200 may be used to detect the handling of smart card 200. Additionally or alternatively, chassis 234 may comprise a strain gauge, which may be used to detect the handling of smart card 200. Chassis 234 may be a separate structure from card backing 236. Alternatively chassis 234 may be integral with card backing 236.

Card backing 236 may comprise a magnetic strip that may be read using a magnetic stripe reader. A magnetic strip may store tracks of data that are used to conduct a transaction using a smart card 200. The tracks of data may include a first track capable of storing alphanumeric characters as well as symbols (e.g., ?, !, &, #, and/or the like), such as account numbers, account holder name, expiration data, security data, and/or other account and/or card related data. The tracks of data may include a second track capable of storing numeric characters such as account numbers, expiration data, security data, and/or other account and/or card related data. The tracks of data may include a third track of data capable of storing numeric characters such as an account number, a PIN, a country code, a currency code, an authorization amount, a balance amount, and/or other account and/or card related data. Additionally or alternatively, card backing 236 may comprise a bar code, a QR code, or an equivalent thereof to store information. Card backing 236 may be made of similar material to that of the output layer 202 and/or the top protective layer 204. Card backing 236 may be made out of a plastic material.

FIG. 2B shows an alternative smart card 201. Smart card 201 may comprise a number of the same, or similar, components as smart card 200. In this regard, smart card 201 may comprise a top output layer 202, a top protective layer 204, a potting 206, a chip 212, a sensor 214, a display 216, a display driver 218, a microcontroller 224, a battery 228, a power management system 230, a printed circuit board (PCB) 232, a chassis 234, and/or a card backing 236 and the components attendant therewith. Smart card 201 differs from smart card 200 in that various components, such as chip 212, display driver 218, microcontroller 224, antenna 226 and/or power management system 230 may be located on a substrate 213. Substrate 213 may be similar to PCB 232. In this regard, substrate 213 may comprise a PCB mounted in a flexible plastic substrate, such as a polyimide, polyether ether ketone, and/or a transparent conductive polyester film. Substrate 213 may comprise one or more electronic components and/or connections that interconnect the elements and/or components of smart card 200. In this regard, substrate 213 may mechanically support and/or electronically (communicatively) connect the electronic components of smart card 200 using, for example, conductive leads, tracks, pads, and/or other features.

Figure 3:
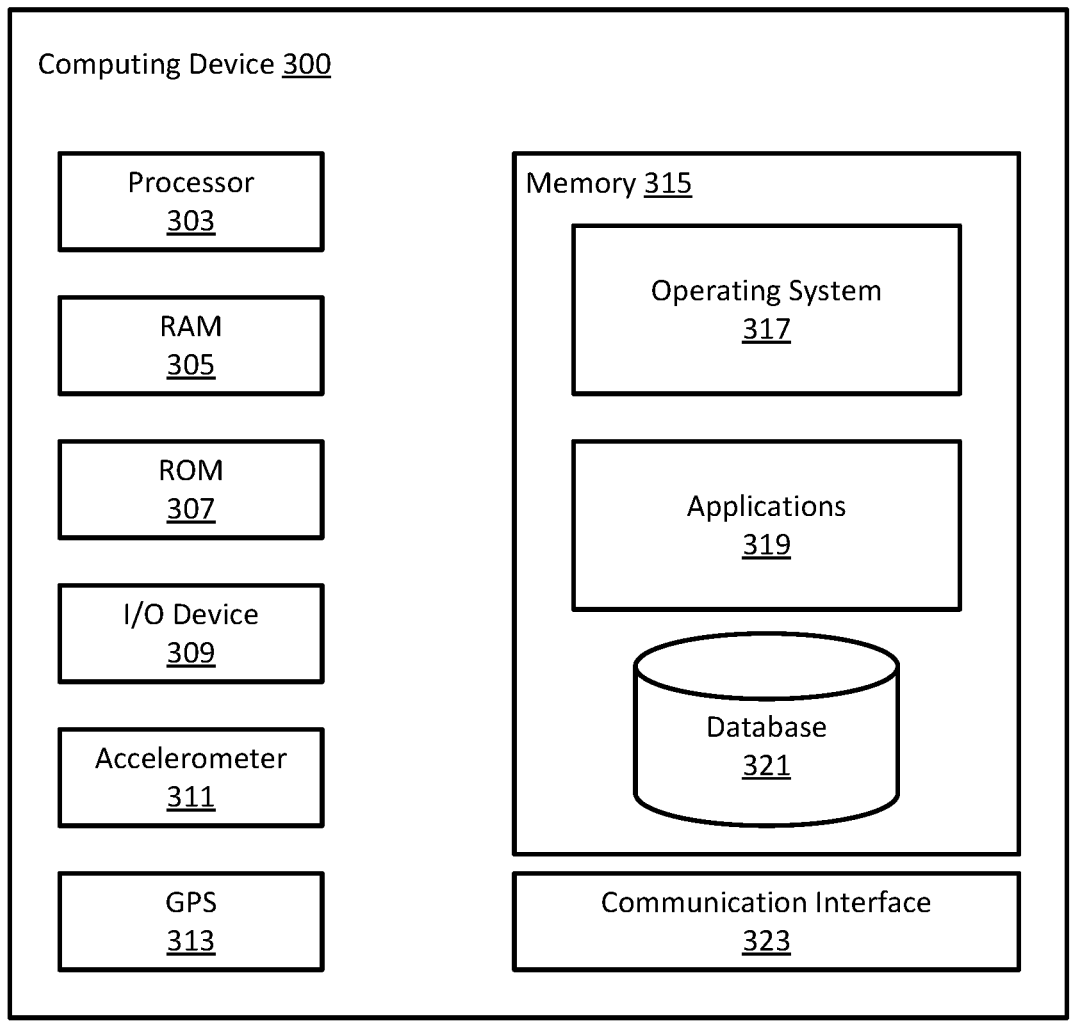
FIG. 3 shows an example computing device.

Any of the devices and systems described herein may be implemented, in whole or in part, using one or more computing devices described with respect to FIG. 3. Turning now to FIG. 3, a computing device 300 that may be used with the card and/or one or more of the computational systems is described. The computing device 300 may comprise a processor 303 for controlling overall operation of the computing device 300 and its associated components, including RAM 305, ROM 307, input/output device 309, accelerometer 311, global-position system antenna 313, memory 315, and/or communication interface 323. A bus (not shown) may interconnect processor(s) 303, RAM 305, ROM 307, memory 315, I/O device 309, accelerometer 311, global-position system receiver/antenna 313, memory 315, and/or communication interface 323. Computing device 300 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 309 may comprise a microphone, keypad, touch screen, and/or stylus through which a user of the computing device 300 may provide input, and may also comprise one or more of a speaker for providing audio output and a video display device for providing textual, audiovisual, and/or graphical output. Software may be stored within memory 315 to provide instructions to processor 303 allowing computing device 300 to perform various actions. For example, memory 315 may store software used by the computing device 300, such as an operating system 317, application programs 319, and/or an associated internal database 321. The various hardware memory units in memory 315 may comprise volatile and nonvolatile, removable and non-removable media implemented in any method or technology for storage of information such as computer-readable instructions, data structures, program modules, or other data. Memory 315 may comprise one or more physical persistent memory devices and/or one or more non-persistent memory devices. Memory 315 may comprise random access memory (RAM) 305, read only memory (ROM) 307, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 303.

Accelerometer 311 may be a sensor configured to measure accelerating forces of computing device 300. Accelerometer 311 may be an electromechanical device. Accelerometer may be used to measure the tilting motion and/or orientation computing device 300, movement of computing device 300, and/or vibrations of computing device 300. The acceleration forces may be transmitted to the processor to process the acceleration forces and determine the state of computing device 300. GPS receiver/antenna 313 may be configured to receive one or more signals from one or more global positioning satellites to determine a geographic location of computing device 300. The geographic location provided by GPS receiver/antenna 313 may be used for navigation, tracking, and positioning applications. In this regard, the geographic may also include places and routes frequented by the first user.

Communication interface 323 may comprise one or more transceivers, digital signal processors, and/or additional circuitry and software, protocol stack, and/or network stack for communicating via any network, wired or wireless, using any protocol as described herein.

Processor 303 may comprise a single central processing unit (CPU), which may be a single-core or multi-core processor, or may comprise multiple CPUs. Processor(s) 303 and associated components may allow the computing device 300 to execute a series of computer-readable instructions (e.g., instructions stored in RAM 305, ROM 307, memory 315, and/or other memory of computing device 315, and/or in other memory) to perform some or all of the processes described herein. Although not shown in FIG. 3, various elements within memory 315 or other components in computing device 300, may comprise one or more caches, for example, CPU caches used by the processor 303, page caches used by the operating system 317, disk caches of a hard drive, and/or database caches used to cache content from database 321. A CPU cache may be used by one or more processors 303 to reduce memory latency and access time. A processor 303 may retrieve data from or write data to the CPU cache rather than reading/writing to memory 315, which may improve the speed of these operations. In some examples, a database cache may be created in which certain data from a database 321 is cached in a separate smaller database in a memory separate from the database, such as in RAM 305 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 300 are described separately, functionality of the various components may be combined and/or performed by a single component and/or multiple computing devices in communication without departing from the disclosure.

Figure 4:
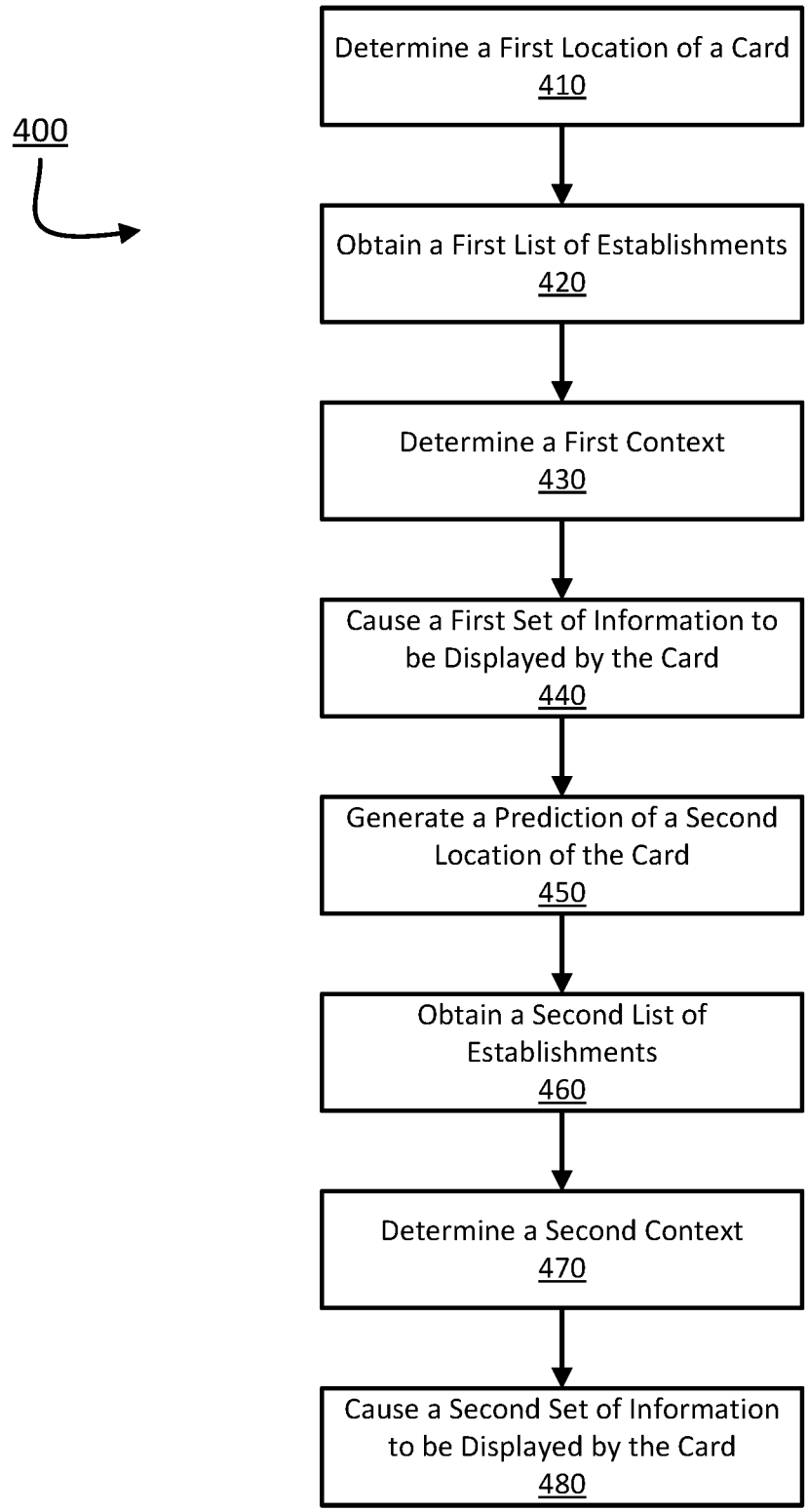
FIG. 4 shows an example process for dynamically changing the display of a smart card in accordance with one or more aspects of the disclosure.

Dynamically updated updating the display of a smart card to limit what is displayed based on a determined context may reduce the likelihood of a bad actor from illegally obtaining information from the smart card. Moreover, dynamically changing the display of a smart card may improve security and data privacy, while preventing data leakage. FIG. 4 shows a flow chart of a process 400 for dynamically updating the information displayed via a smart card in accordance with one or more aspects of the disclosure. Some or all of the steps of process 400 may be performed using a smart card and/or one or more computing devices as described herein.

In step 410, a computing device (e.g., chip 212 on smart card 200, an application executing on chip 212) may determine a first location of the smart card. The first location may be a geographic location, a relative location, and/or an absolute location. The first location may be determined, for example, using one or more antennas or a radiolocation mechanism of the smart card. The radiolocation mechanism may comprise an antenna or another suitable transceiver configured to determine the location of the smart card. According to one example, the location of the smart card may be determined using global positioning satellites (GPS). For example, the smart card (e.g., one or more antennas and/or the radiolocation mechanism of the smart card) may receive one or more signals from one or more global positioning satellites. Based on the one or more received signals, the smart card may calculate a geographic location of the smart card. The geographic location may be determined using trilateration and/or multilateration, for example, based on an angle of arrival of the one or more received signals, a time difference of arrival of the one or more received signals, and/or a location signature of the one or more received signals. In another example, the location of the smart card may be determined using one or more beacons, such as an indoor positioning beacon or a BLE beacon. Similar to the example above, the smart card may receive one or more signals from one or more beacons. The one or more signals may comprise location information associated with a beacon that transmitted the signal. The smart card may then calculate a distance between the smart card and the beacon based on the signal. Based on the distance between the smart card and the beacon and the location information associated with each of the one or more beacons, the smart card may determine a geographic location of the smart card. In further examples, the smart card may use a combination of GPS signals and/or beacon signals to determine the location of the smart card. In yet another example, the smart card may receive location information from a mobile device and/or a payment terminal (e.g., a point-of-sale terminal).

Based on determining its location, the smart card may obtain a list of establishments associated with the first location, in step 420. The list of establishment may be a list of establishments known to be associated with the first location. In some examples, the smart card may transmit the first location to a third-party, such as a server or a mobile device, with a request for establishments surrounding the first location. The smart card may receive the list of establishments, for example, in response to transmitting the request. In step 430, the smart card may determine a first context associated with the smart card. The first context may be based on the first geographic location. Additionally or alternatively, the first context may be determined using historical information of the user, in addition to the first location. The historical information may comprise transactional information, such as merchant transaction history, purchase history, etc. For example, the first location and the historical information may be used in conjunction to determine that the smart card has been presented at a merchant associated with the first location previously. Alternatively, the first location and the historical information may be used to determine that a merchant associated with the first location offers a product that a user of the smart card has previously purchased.

Based on the first context, the smart card may select what information to display on the smart card. In step 440, the smart card may cause a first set of information to be presented by a display of the smart card. The first set of information may comprise personal identifiable information (PII) of a user of the smart card. The PII may comprise the user's photo, their full legal name, an identification number (e.g., a driver's license number, a social security number, etc.), a personal address, a date-of-birth, etc. In some instances, the first set of information may comprise one or more of an account number, an expiration date of the account, a CVV, etc. Steps 410-440 may be repeated, for example, when a location of the smart card can be readily ascertained. In some instances, repeating steps 410-440 too frequently may expend the power supply of the smart card. In this regard, the smart card may receive an instruction to change a frequency with which the smart card determines location. In some instances, the location of the smart card may not be readily discernable. Alternatively, it may simply be more efficient to predict the next location of the smart card and render the information accordingly. In step 450, the smart card may generate a prediction of a next, second location of the smart card. Like the first location, the second location may be a geographic location, a relative location, and/or an absolute location. The second location may be predicted, for example, using predictive modeling, predictive analytics, and/or machine learning. In this regard, the predictive model, predictive analytics, and/or machine learning model may review historical information of the user and/or the smart card. Based on the historical information and/or the first location of the smart card, the smart card may predict the second location of the smart card.

In step 460, the smart card may obtain a second list of known establishments, for example, based on the second location. Similar to step 420 above, the second list of establishments may be known as being associated with the second location. In step 470, the smart card may determine a second context associated with the smart card. As discussed above, the second context may be based on the second location and/or historical information of the user. Based on the second context, the smart card may select a second set of information to present via the display of the smart card. In step 480, the smart card may cause the second set of information to be presented by the display on the smart card. As noted above, the second set of information may comprise PII or transactional information. In some instances, the second set of information may comprise one or more indications. For example, the one or more indications may comprise a first indication that a user of the smart card is permitted to perform a first action; a second indication that the user of the smart card is permitted to perform a second action; or a third indication that the user is not permitted to perform the first action or the second action. The one or more indications may be conveyed via the display or, for example, through the use of light emitting diodes (LEDs) located on the smart card. For example the first indication may be a green light that indicates that the user may purchase alcohol and tobacco. The second indication may be a yellow light that indicates that a user may purchase tobacco, but not alcohol. The third indication may be a red light that conveys that the user may not purchase alcohol or tobacco.

The method described above may limit the information conveyed via a display of a smart card. This may prevent malicious users from illegally obtaining information displayed on the smart card, may improve privacy, and/or may prevent data leakage.

Figure 5A:
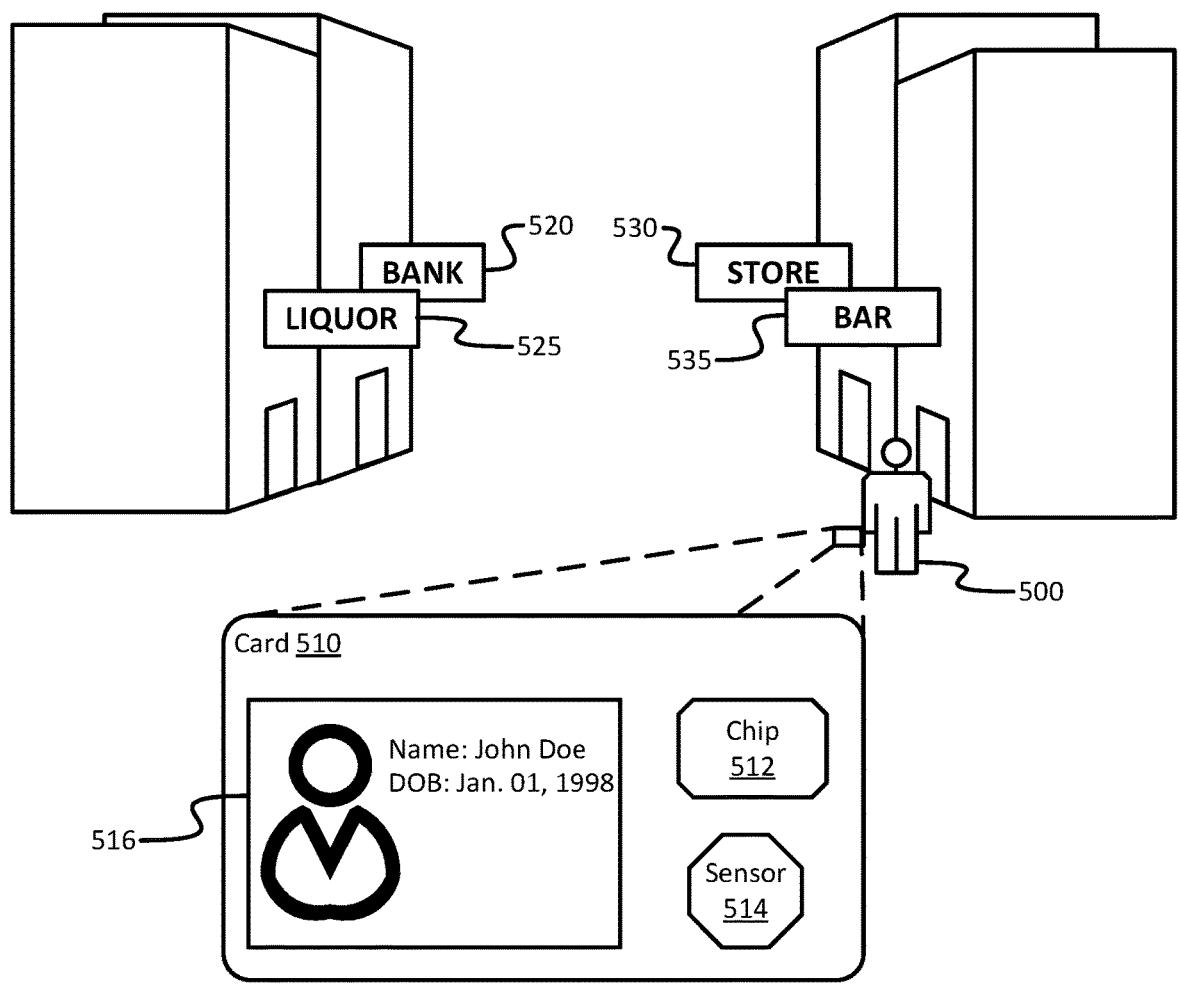
FIGS. 5A and 5B shows an example of dynamically updating the display of a smart card in accordance with one or more aspects of the disclosure.
Figure 5B:
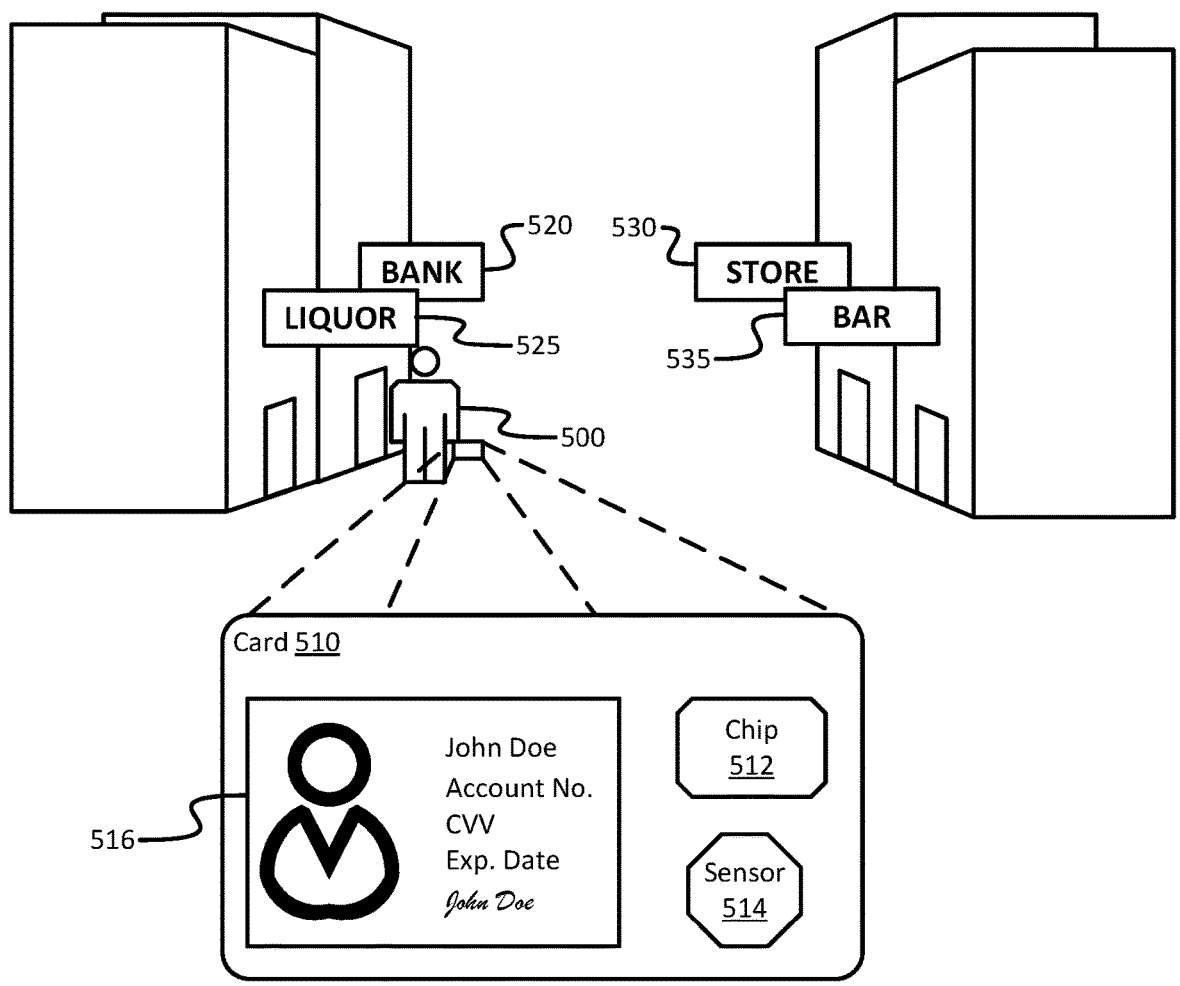

FIGS. 5A and 5B show an example of dynamically updating the information displayed on a smart card in accordance with one or more aspects of the disclosure. FIG. 5A shows a user 500, a plurality of establishments (e.g., bank 520, liquor store 525, store 530, and bar 535), and a plurality of global positioning satellites (e.g., first satellite 540, second satellite 545, and third satellite 550). User 500 may be in possession of a smart card, such as smart card 510. As noted above, smart card 510 may comprise at least chip 512, sensor 514, and display 516.

Smart card 510 may periodically determine a location of smart card 510. As illustrated in FIG. 5A, smart card 510 may determine the location of smart card 510 upon receiving one or more signals from at least one of first satellite 540, second satellite 545, or third satellite 550. The one or more signals may be used to calculate the first geographic location of smart card 510. Once the location is determined, the smart card may obtain a list of establishments proximately located to the location. As shown in FIG. 5A, this may include, for example, bank 520, liquor store 525, store 530, and bar 535. Smart card 510 may determine, based on the location, which establishment user 500 may be patronizing. Additionally or alternatively, smart card 510 may use predictive modeling (e.g., predictive analytics, machine learning), historical information, contextual information, or any combination thereof. For example, smart card 510 may have historical information that user 500 has frequented bar 535 in the past. Accordingly, smart card 510 may determine that user 500 is patronizing bar 535. In another example, smart card 510 may determine that user 500 is patronizing bar 535, for example, based on contextual information, such as the date and/or time. In this regard, smart card 510 may determine that user 500 is patronizing bar 535, for example, if the location is determined on a Friday night after 9:00 pm. In this regard, smart card 510 may determine that one or more of the other establishments are closed. Additionally or alternatively, smart card 510 may determine that user 500 is of an appropriate demographic (e.g., age, relationship status, etc.) that would patronize bar 535 on a weekend night. Based on a determination that user 500 is patronizing bar 535, smart card 510 may update the information presented on display 516. In this regard, smart card 510, via display 516, may display the minimum amount of information necessary for bar 535. For example, display 516 may cause an image of user 500 to be displayed, in addition to user 500's name and date of birth.

Turning to FIG. 5B, smart card 510 may determine the location of smart card 510, as discussed above. Upon determination of the location, the smart card may obtain a list of establishments located proximate to the location. Smart card 510 may use the list of establishments to determine which establishment user 500 is patronizing. Based on one or more of the location, predictive modeling (e.g., predictive analytics, machine learning), historical information, or contextual information, smart card 510 may determine that user 500 is patronizing bank 520. As noted above, the determination may be based on contextual information, such as the date and/or time. Smart card 510 may determine that user 500 is patronizing bank 520, for example, based on the location being determined on a Tuesday at 10:00 am. Based on a determination that user 500 is patronizing bank 520, smart card 510 may update the information presented on display 516 to include an image of user 500, user 500's name, an account number, a CVV, an expiration date, and/or user 500's signature.

Figure 6A:
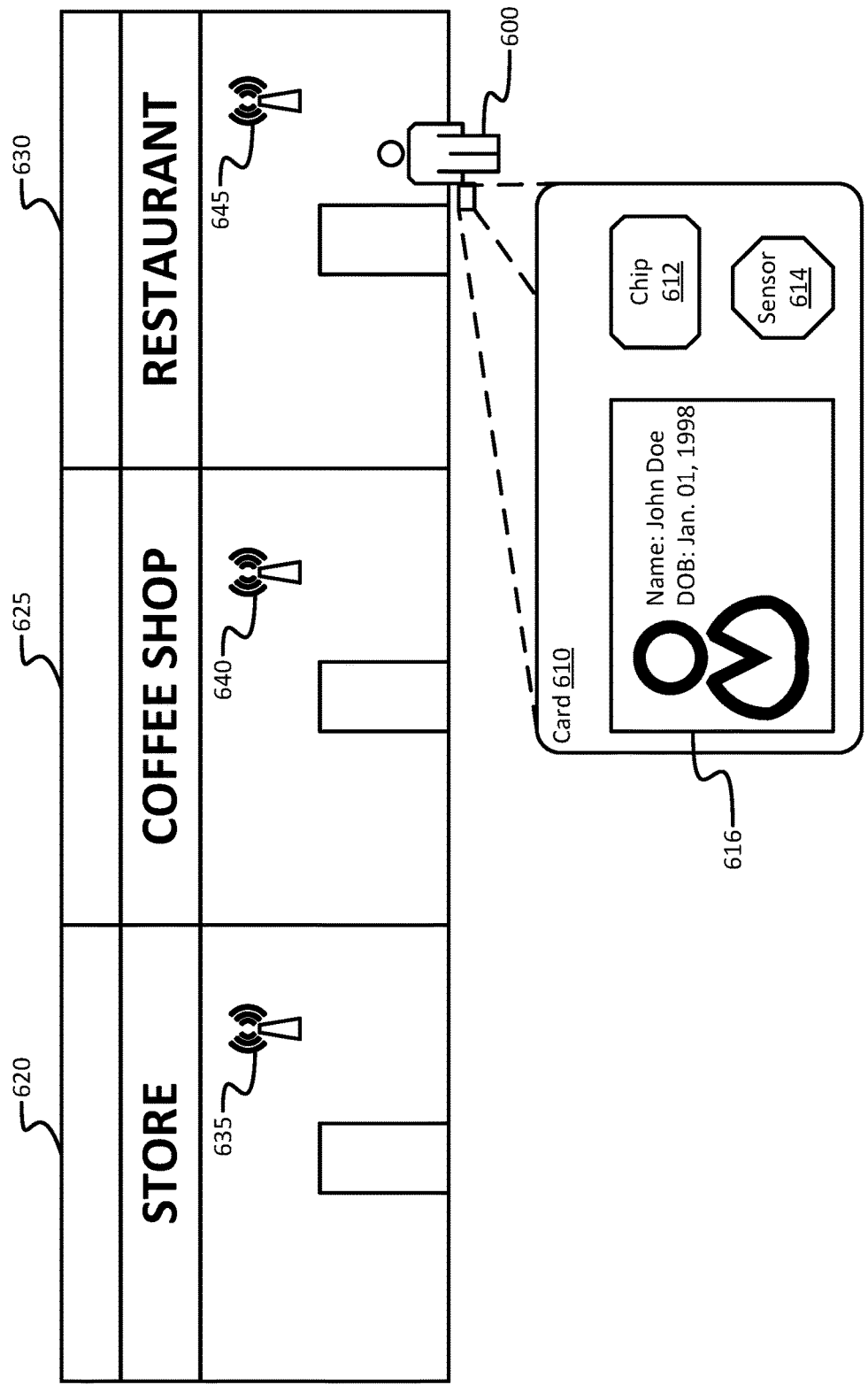
FIGS. 6A and 6B shows an example of dynamically changing the display of a smart card according to one or more aspects of the disclosure.
Figure 6B:
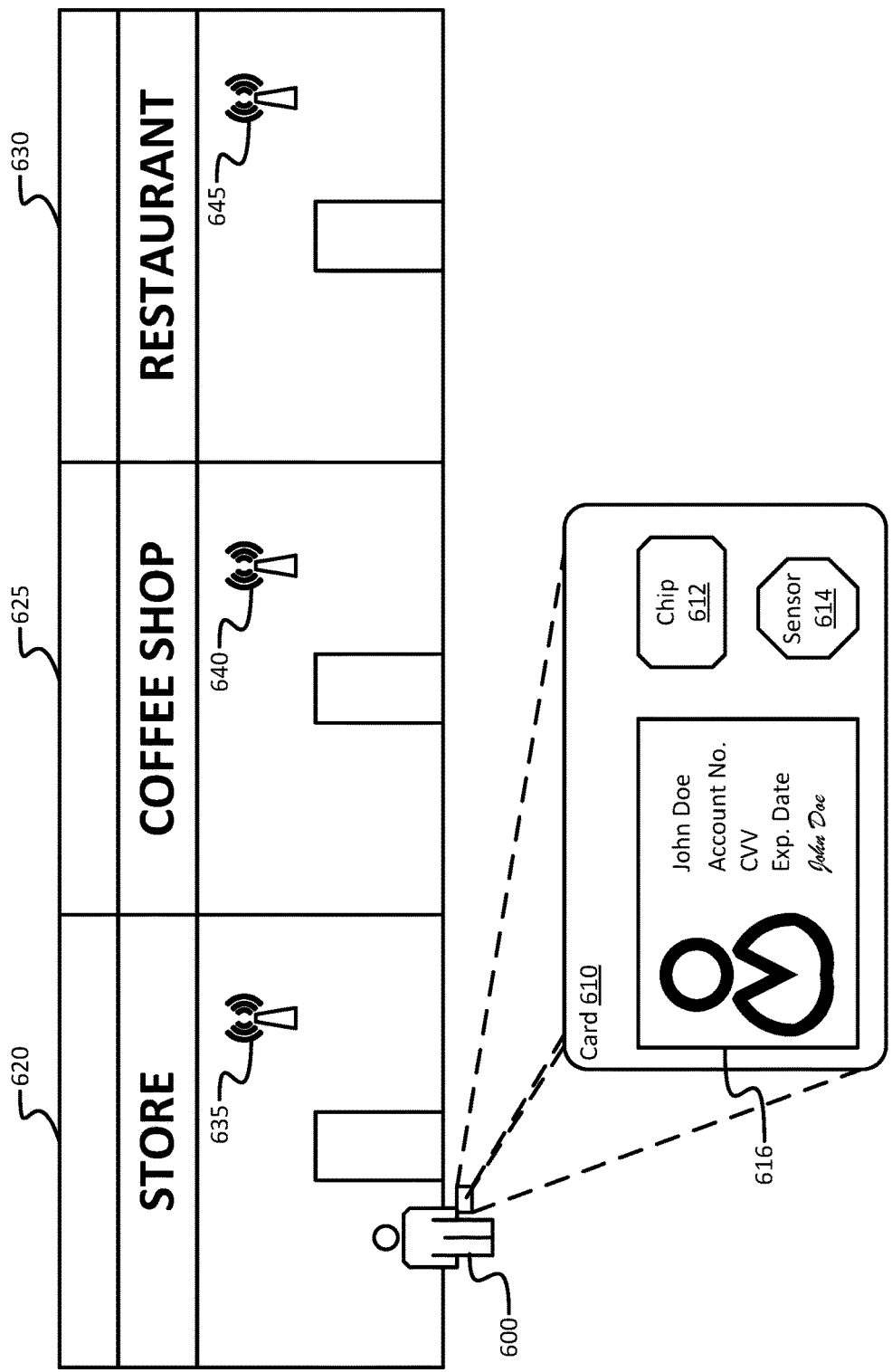

FIGS. 6A and 6B show an example of dynamically updating the information displayed on a smart card in accordance with one or more aspects of the disclosure. FIG. 6A shows a user 600, a plurality of establishments (e.g., store 620, coffee shop 625, restaurant 630), and a plurality of beacons (e.g., first beacon 635, second beacon 640, third beacon 645). Similar to FIGS. 5A and 5B above, user 600 may possess a smart card, such as smart card 610, which includes chip 612, sensor 614, and display 616.

As discussed herein, smart card 610 may determine a location of smart card 610. FIG. 6A shows that smart card 610 may determine the location of smart card 610, for example, based on receiving one or more signals from at least one of first beacon 635, second beacon 640, or third beacon 645. The one or more signals may comprise information indicating the location of the beacon. Smart card 610 may calculate a distance between the smart card and the beacon, for example, based on a transmission time and/or reception time of the signal. Based on the determined distance between smart card 610 and the beacon, smart card 610 may determine that smart card 610 is patronizing restaurant 630. Additionally or alternatively, smart card 610 may use predictive modeling (e.g., predictive analytics, machine learning), historical information, contextual information, or any combination thereof to determine a context for smart card. In this example, smart card 610 may have historical information that user 600 has previously frequented restaurant 630. In another example, smart card 610 may determine the context for smart card 610 using contextual information, such as the date and/or time. Smart card 610 may determine that user 600 is patronizing restaurant 630, for example, if the location is determined on a weeknight at 6:30 pm. Based on a determination that user 600 is patronizing restaurant 630, smart card 610 may update the information presented on display 616. Smart card 610, via display 616, may display the minimum amount of information necessary for restaurant 630, which may include an image of user 600, user 600's name, and user 600's date of birth.

FIG. 6B shows smart card 610 may determine a second location of smart card 610 using the techniques described above. Upon determination of the second location, smart card 610 may retrieve a list of establishments proximately located to the second location. Smart card 610 may use the list of establishments to determine which establishment user 600 is patronizing. Based on one or more of the location, predictive modeling (e.g., predictive analytics, machine learning), historical information, or contextual information, smart card 610 may determine that user 600 is patronizing store 620. Based on the determination, smart card 610 may update the information presented on display 616 to include an image of user 600, user 600's name, an account number, a CVV, an expiration date, and/or user 600's signature.

The above-described systems, devices, and methods may limit what is displayed via a smart card to prevent bad actors from obtaining information displayed via the smart card. Additionally, limitations on what is displayed via the smart card may prevent malicious users from illegally obtaining information displayed on the smart card, privacy may be improved, and/or data leakage may be prevented.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method for dynamically limiting and changing user information displayed on a smart card of a user based on location of the user, the method comprising:
   determining, using one or more antennas of the smart card, a first geographic location of the smart card, wherein the smart card comprises a display, a microcontroller, a memory, and a sensor on the smart card, wherein the display is configured to display user information including financial information and identification information stored in the memory,
      wherein the one or more antennas are configured to determine the first geographic location without communicating with a mobile device or other computing device of the user,
      wherein the smart card is in electronic communication via a network with a server having a connected database, the database storing historical transactional data of the user,
      wherein the smart card is configured for electronic communication with a point of sale (POS) terminal of a merchant for completing transactions with the merchant that include the display of the identification information of the user;
   transmitting, by the microcontroller of the smart card, the first geographic location to the server with a request for a first list of commercial establishments associated with the first geographic location;
   receiving, from the database of the server, by the microcontroller of the smart card and based on the first geographic location of the smart card, the first list of commercial establishments associated with the first geographic location;
   determining, by the microcontroller and based on the first geographic location of the smart card, a first context by comparing user information, stored in the memory of the smart card, to the first list of commercial establishments associated with the first geographic location, wherein the first context comprises a type of establishment of the merchant or goods or services provided by the merchant;
   selecting, by the microcontroller, a first subset of the user information stored in the memory of the smart card, wherein the first subset of the user information is associated with the first context and is to be presented by the display on the smart card while non-selected user information is not presented by the display, wherein the first subset of the user information represents a minimum amount of information necessary to complete a first transaction within the first context at the first geographic location, wherein the microcontroller hides the non-selected user information;
   displaying on the display, based on the sensor receiving an input and by the microcontroller in communication with the sensor, when the user is attempting to complete the first transaction at the POS terminal, the selected first subset of the user information, without displaying the non-selected user information, for a limited time;
   generating a prediction, by the microcontroller and based on the first geographic location of the smart card and the historical transactional data, of a second geographic location of the smart card, wherein the prediction is based on a predictive model generated by machine learning;
   receiving, from the database of the server, by the microcontroller and based on the prediction of the second geographic location, a second list of commercial establishments associated with the second geographic location;
   determining, by the microcontroller and based on the prediction of the second geographic location of the smart card, a second context by comparing the user information, stored in the memory of the smart card, to the second list of commercial establishments associated with the second geographic location, wherein the second context is different from the first context and the second context comprises the type of establishment of the merchant or the goods or services provided by the merchant within the second context; and
   selecting, by the microcontroller, a second subset of the user information stored in the memory of the smart card, wherein the second subset of the user information is associated with the second context and is to be presented by the display on the smart card, wherein the second subset of the user information comprises information associated with performing a second transaction associated with the second context, wherein the selected second subset of the user information is dynamically updated relative to the first subset of the user information and is limited to a minimum amount of information necessary to complete the second transaction, the second subset of the user information comprising at least one of:

a first indication that the user of the smart card is permitted to purchase a first product type and a second product type within the second context;

a second indication that the user of the smart card is permitted to purchase the first product type and prohibited from purchasing the second product type within the second context; or a third indication that the user is prohibited from purchasing the first product type and the second product type within the second context.

2. The method of claim 1, wherein the second subset of the user information comprises personal identifiable information of the user of the smart card.

3. The method of claim 1, wherein the smart card comprises at least one of:
an identification card; or
a bank card.

4. The method of claim 1, wherein the determining the first geographic location of the smart card comprises:
receiving a plurality of signals from a plurality of global positioning satellites; and
calculating the first geographic location of the smart card based on the plurality of signals received from the plurality of global positioning satellites.

5. The method of claim 1, wherein the determining the first geographic location of the smart card comprises:
receiving a signal from a beacon, wherein the signal comprises location information associated with the beacon;
calculating a distance between the smart card and the beacon based on the signal; and
determining, based on the distance between the smart card and the beacon and based on the location information associated with the beacon, the first geographic location of the smart card.

6. The method of claim 1, wherein the determining the first geographic location of the smart card comprises:
receiving location information from a mobile device associated with a user of the smart card.

7. The method of claim 1, wherein the determining the first geographic location of the smart card comprises:
receiving location information from the terminal in response to the smart card being presented for a transaction.

8. The method of claim 1, wherein the determining the second context further comprises:
determining that the second geographic location correlates with a previous transaction in the historical transaction data.

9. The method of claim 1, wherein the determining the second context associated with the second geographic location of the smart card further comprises:
determining that the smart card is being presented at one or more of: a store, a restaurant, or a bar.

10. The method of claim 1, further comprising:
changing, by the microcontroller and based on a certain amount of power having been expended over a predetermined period of time, a frequency with which the smart card determines location.

11. The method of claim 1, wherein the first product type is tobacco products and the second product type is alcoholic beverages.

12. A smart card configured to dynamically limit and change user information displayed on the smart card of a user based on location of the user, the smart card comprising:

a microcontroller configured to receive one or more signals that allow the smart card to determine a geographic location without communicating with a mobile device or other computing device of the user;
a memory configured to store user information;
a sensor;
a display; and
a processor configured to
determine, based on the geographic location of the smart card, a context associated with the smart card by comparing the user information, stored in the memory, to a list of commercial establishments associated with the geographic; location, wherein the context comprises a type of establishment of a merchant or goods or services provided by the merchant,
select, a subset of the user information stored in the memory of the smart card, wherein the subset of the user information is associated with the context and is to be presented by the display while non-selected user information is hidden and not presented by the display, wherein the subset of the user information represents a minimum amount of information necessary to complete a transaction within the context at the geographic location,
wherein the display is configured to:
based on the sensor receiving an input when the user is attempting to complete the transaction at a point of sale terminal, display the selected subset of the user information without displaying the non-selected user information, for a limited time
wherein the subset of the user information presented in a first context comprises a name of a user and a date of birth of the user, and
wherein the subset of the user information presented in a second context does not include a date of birth of the user.

13. The smart card of claim 12, wherein the microcontroller comprises an antenna configured to receive a plurality of signals from a plurality of global positioning satellites, wherein the processor is further configured to calculate the geographic location of the smart card based on the plurality of signals received from the plurality of global positioning satellites.

14. The smart card of claim 12, wherein the microcontroller comprises a short-range wireless transceiver configured to receive a signal from a beacon, wherein the signal comprises location information associated with the beacon.

15. The smart card of claim 14, wherein the processor is further configured to:
calculate a distance between the smart card and the beacon based on the signal; and
determine the geographic location of the smart card based on the distance between the smart card and the beacon and based on the location information associated with the beacon.

16. The smart card of claim 12, wherein the display comprises at least one of:
a liquid crystal display (LCD) screen;
a light emitting diode (LCD) display;
an e ink display;
an electronic paper display; or
a microparticle-based display.

17. A smart card configured to dynamically limit and change user information displayed on a smart card of a user based on location of the user, the smart card comprising:
one or more processors;
one or more antennas;

a sensor;

a display configured to display user information including financial information and identification information; and memory storing instructions that, when executed by the one or more processors, cause the smart card to:

determine, using the one or more antennas, a first geographic location of the smart card without communicating with a mobile device or other computing device of the user;

transmit, to a server having a database which stores historical transactional data of the user, the first geographic location with a request for a first list of commercial establishments associated with the first geographic location;

receive from the database of the server and based on the first geographic location of the smart card, the first list of commercial establishments associated with the first geographic location;

determine, based on the first geographic location, a first context by comparing user information, stored in the memory, to the first list of commercial establishments associated with the first geographic location, wherein the first context comprises a type of establishment of a merchant or goods or services provided by a merchant;

select, a first subset of the user information stored in the memory of the smart card, wherein the first subset of the user information is associated with the first context and is to be presented by the display while non-selected user information is hidden and not presented by the display, wherein the first subset of the user information represents a minimum amount of information necessary to complete a first transaction within the first context at the first geographic location;

display on the display, based on the sensor receiving an input when the user is attempting to complete the first transaction at a point of sale terminal, the selected first subset of the user information, without displaying the non-selected user information, for a limited time;

generate a prediction, based on the first geographic location and the historical transactional data, of a second geographic location of the smart card, wherein the prediction is based on a predictive model generated by machine learning;

receive, from the database of the server and based on the prediction of the second geographic location of the smart card, a second list of commercial establishments associated with the second geographic location;

determine, based on the prediction of the second geographic location, a second context by comparing the user information to the second list of commercial establishments associated with the second geographic location, wherein the second context is different from the first context and the second context comprises the type of establishment of the merchant or the goods or services provided by the merchant within the second context; and select a second subset of the user information stored in the memory of the smart card, wherein the second subset of the user information is associated with the second context and is to be presented by the display, wherein the second subset of the user information comprises information associated with performing a second transaction associated with the second context, wherein the selected second subset of the user information is dynamically updated relative to the first subset of the user information and represents a minimum amount of information necessary to complete the second transaction, the second subset of the user information comprising at least one of:

a first indication that a user of the smart card is permitted to purchase a first product type and a second product type;

a second indication that the user of the smart card is permitted to purchase the first product type and prohibited from purchasing the second product type; or a third indication that the user is prohibited from purchasing the first product type and the second product type.

18. The smart card of claim 17, wherein the instructions, when executed by the one or more processors, cause the smart card to:

receive at least one signal from one or more computing devices, wherein the first geographic location is determined based on the at least one signal received from the one or more computing devices.

19. The smart card of claim 17, wherein the second subset of the user information comprises personal identifiable information of a user of the smart card.

20. The smart card of claim 17, wherein the instructions, when executed by the one or more processors, that cause the smart card to determine the second context further cause the smart card to:

determine that the second geographic location correlates with a previous transaction in the historical transaction data.

* * * * *